(12) United States Patent
Rachman et al.

(10) Patent No.: US 7,735,057 B2
(45) Date of Patent: Jun. 8, 2010

(54) METHOD AND APPARATUS FOR PACKAGING AND STREAMING INSTALLATION SOFTWARE

(75) Inventors: Ophir Rachman, Sunnyvale, CA (US); Uri Raz, Palo Alto, CA (US); Danny Holzman, Redwood City, CA (US); Ryan M. McCarten, Redwood City, CA (US); Gilad A. Ben Zeev, San Francisco, CA (US); Yaron Halperin, Sunnyvale, CA (US); Gabriel Malka, Redwood City, CA (US)

(73) Assignee: Symantec Corporation, Mountain View, CA (US)

(*) Notice: Subject to any disclaimer, the term of this patent is extended or adjusted under 35 U.S.C. 154(b) by 990 days.

(21) Appl. No.: 10/646,416

(22) Filed: Aug. 21, 2003

(65) Prior Publication Data

US 2004/0230971 A1    Nov. 18, 2004

Related U.S. Application Data

(60) Provisional application No. 60/471,426, filed on May 16, 2003.

(51) Int. Cl.
G06F 9/44 (2006.01)
G06F 9/445 (2006.01)

(52) U.S. Cl. .................. 717/100; 717/174
(58) Field of Classification Search .......... 717/100, 717/174–177
See application file for complete search history.

(56) References Cited

U.S. PATENT DOCUMENTS

| 5,487,167 | A | 1/1996 | Dinallo et al. |
| 5,802,292 | A | 9/1998 | Mogul |
| 6,311,221 | B1 | 10/2001 | Raz et al. |
| 6,374,402 | B1 | 4/2002 | Schmeidler et al. |
| 6,453,334 | B1 | 9/2002 | Vinson et al. |
| 6,546,554 | B1* | 4/2003 | Schmidt et al. .............. 717/176 |
| 6,574,618 | B2 | 6/2003 | Eylon et al. |
| 6,718,373 | B1* | 4/2004 | Bearden et al. ............. 709/220 |
| 6,763,370 | B1 | 7/2004 | Schmeidler et al. |
| 2001/0034736 | A1 | 10/2001 | Eylon et al. |
| 2001/0037399 | A1 | 11/2001 | Eylon et al. |
| 2001/0037400 | A1 | 11/2001 | Raz et al. |
| 2001/0044850 | A1 | 11/2001 | Raz et al. |
| 2002/0009538 | A1 | 1/2002 | Arai |

(Continued)

OTHER PUBLICATIONS

Pramote Kuacharoen, Vincent J. Mooney, Vijay K. Madisetti, "Software Streaming via Block Streaming", Mar. 2003, Proceedings of the conference on Design, Automation and Test in Europe—vol. 1, retrieved from ACM Nov. 21, 2006.*

*Primary Examiner*—Philip Wang
(74) *Attorney, Agent, or Firm*—Meyertons, Hood, Kivlin, Kowert & Goetzel, P.C.

(57) ABSTRACT

A software application streamed from a host system to a target system comprises the installation or configuration logic for another software application. In certain embodiments, the installation logic conforms to a well-known installation standard. The described technique allows the use and/or execution of installation logic or other related objects when these objects do not exist in their entirety on the target system. The application installation that results from this process may configure the subsequent application to be delivered only in part (in streamed mode) or in its entirety.

26 Claims, 12 Drawing Sheets

U.S. PATENT DOCUMENTS

| | | |
|---|---|---|
| 2002/0042833 A1 | 4/2002 | Hendler et al. |
| 2002/0083183 A1 | 6/2002 | Pujare et al. |
| 2002/0087717 A1 | 7/2002 | Artzi et al. |
| 2002/0087883 A1 | 7/2002 | Wohlgemuth et al. |
| 2002/0087963 A1* | 7/2002 | Eylon et al. ................. 717/174 |
| 2002/0091763 A1 | 7/2002 | Shah et al. |
| 2002/0138640 A1 | 9/2002 | Raz et al. |
| 2002/0157089 A1 | 10/2002 | Patel et al. |
| 2002/0161908 A1 | 10/2002 | Benitez et al. |
| 2003/0004882 A1* | 1/2003 | Holler et al. .................. 705/51 |
| 2003/0009538 A1 | 1/2003 | Shah et al. |
| 2003/0056112 A1 | 3/2003 | Vinson et al. |
| 2003/0078959 A1* | 4/2003 | Yeung et al. ................ 709/201 |
| 2004/0143586 A1* | 7/2004 | Chung ........................ 707/100 |
| 2008/0281884 A1* | 11/2008 | Subrahmanyam ........... 707/205 |

* cited by examiner

METHOD AND APPARATUS FOR PACKAGING AND STREAMING INSTALLATION SOFTWARE

This application claims the benefit of provisional U.S. patent application No. 60/471,426, filed on May 16, 2003 and entitled, "Method and Apparatus for Streaming Software to a Target Processing System," which is incorporated herein by reference.

FIELD OF THE INVENTION

At least one embodiment of the present invention pertains to techniques for packaging and streaming software from a server to a client, and more particularly, to techniques for packaging and streaming an installation program to a client to configure the client for streaming of a subsequent software application.

BACKGROUND

U.S. Pat. No. 6,311,221 of Raz et al. ("Raz"), which is incorporated herein by reference, describes various computer-implemented methods for streaming a software application from a server to a client. "Streaming" in this context refers to a technique in which only portions of a software application are downloaded from a host processing system (e.g., a server) to a target processing system (e.g., a client), and the application is executed on the client using only those downloaded portions while other portions of the application are downloaded to the client in the background on an as needed basis. For example, as described by Raz, a computer application can be divided into a set of modules, such as the various Java classes and data sets which comprise a Java applet. Once an initial module or modules are delivered to the client, the application begins to execute while additional modules are streamed in the background. The modules are streamed to the user in an order which is selected to deliver the modules before they are required by the locally executing software. The sequence of streaming can be varied in response to the manner in which the user operates the application to ensure that needed modules are delivered prior to use as often as possible. To reduce streaming time, the size of code files, such as library modules, can be reduced by substituting various coded procedures with shortened streaming "stub" procedures which act as link-time substitutes for the removed code. Suitable modules to replace are those which are not required for the initial execution of the application. As the application is running locally on the client, additional modules are streamed to the client and the stub code can be dynamically replaced as the substituted procedures are received. The stub procedure can point to a streaming engine which will request a missing procedure if the program calls it before it has been received at the client.

U.S. patent application Publication No. U.S. 2001/0034736 A1 of Eylon et al. ("Eylon '736"), which is incorporated herein by reference, describes client software that can be used to facilitate application streaming techniques. As described by Eylon '736, a client system can be provided with client-side streaming support software which establishes a virtual file system ("VFS") and connects it to the client's operating system, such that the VFS appears to be a storage device. The VFS is accessed via a dedicated streaming file system driver (FSD) and is configured as a sparsely populated file system which appears to the operating system to contain the entire set of application files but, in practice, will typically contain only portions of selected files. Eylon '736 describes that a software application to be executed is stored as a set of blocks ("streamlets") on a server, where each streamlet corresponds to a data block which would be processed by the native operating system running on the client system if the entire application were locally present. For example, the streamlets may be 4 kbyte blocks, since standard Windows systems utilize a 4 kbyte code page when loading data blocks from disk or in response to paging requests.

U.S. patent application Publication No. U.S. 2001/0037399 A1 of Eylon et al. ("Eylon '399"), which is incorporated herein by reference, addresses a server system that can be used to facilitate application streaming techniques. The server system comprises an application streaming manager which coordinates the transmission of application streamlets to a client system. To improve responsiveness of the application on the client side, the server system also comprises a predictive engine to determine an optimal order to provide streamlets to a client. The predictive engine operates on one or more predictive models which can be generated using information gathered from user interaction with the streaming application and monitoring the order in which various sections of the application's files are accessed as the application runs.

As described by Eylon '399, when the server receives a request from a client to start a particular streamed application for the first time, the file structure for the application is forwarded to the client. Preferably, a starting set of streamlets sufficient for enabling the application to start execution is forwarded to the client as well. A program thread to coordinate the pushing of streamlets to a given client is started on the server which actively pushes streamlets to the client in accordance with the predictive model and possibly additional data forwarded to the server from the client while the application executes.

Before an application can be streamed to a client, it must be packaged in an appropriate format. Application streaming technology such as described above can be based on packaging an application using "snapshot" techniques which are standard and common in the software packaging industry. Many software applications, however, are already packaged according to a well-known installation standard, such as the MSI installation standard, InstallShield installation format, WISE installation format, etc. The MSI installation standard, for example, defines the standard file format for application installation in a Microsoft Windows operating system environment. It is desirable, among other things, to be able to use, essentially "as is", a package formatted according to any of numerous installation standards, with minimal manual intervention to convert it to a package usable for streaming.

SUMMARY OF THE INVENTION

In one aspect, the invention includes a method comprising streaming an installation program to a target processing system over a network. The installation program is for use in installing a software application. The method in certain embodiments further comprises using the installation program on the target processing system in a streaming mode to configure the target processing system for execution of the software application.

In another aspect, the invention includes packaging an installation program in a form that facilitates streaming of the installation program to a target processing system, and streaming the installation program to the target processing system to cause the target processing system to be configured to execute the software application.

The invention further includes an apparatus corresponding to the above-mentioned methods.

Other features of the present invention will be apparent from the accompanying drawings and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
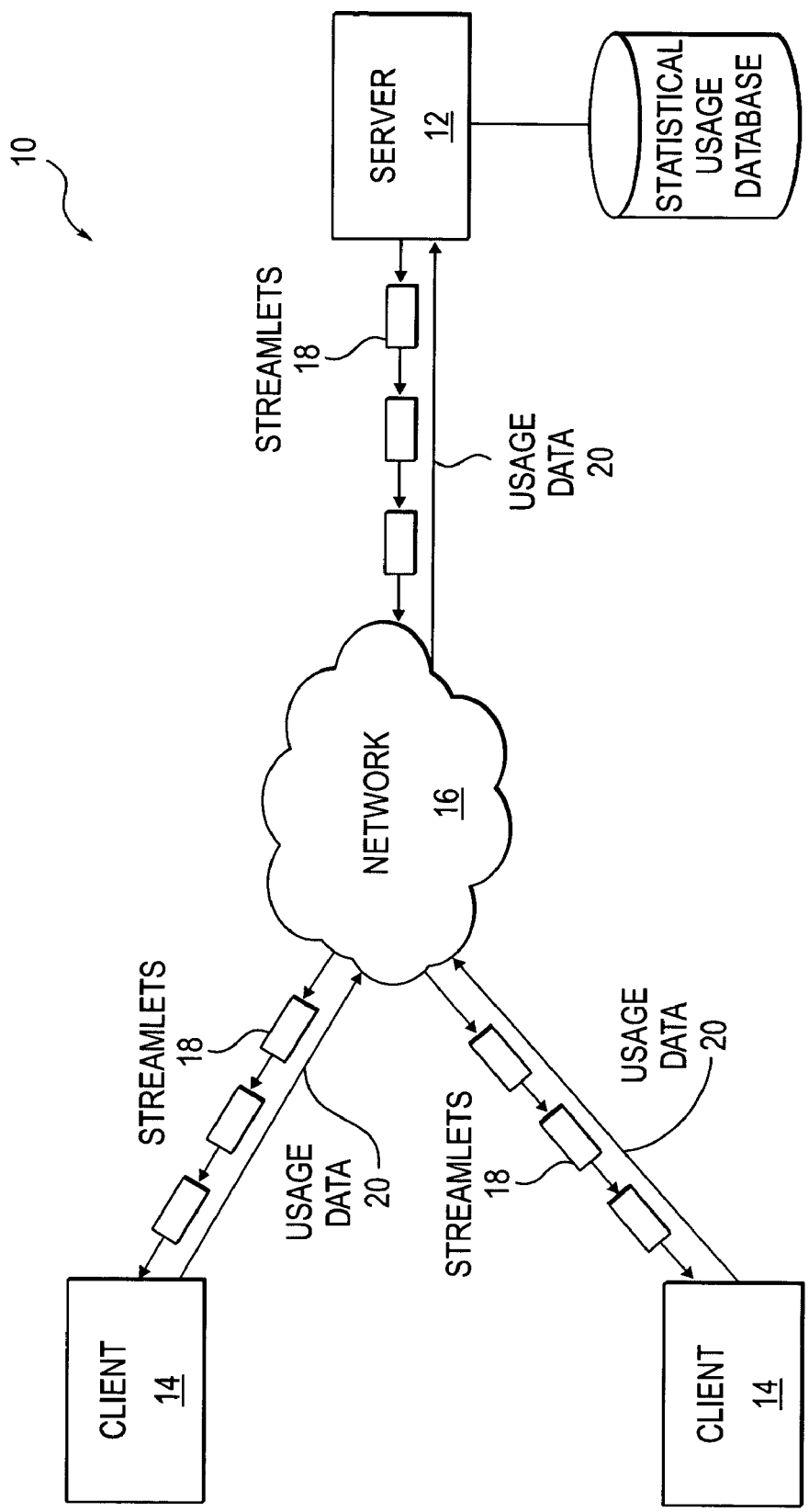
FIG. 1 is a high-level block diagram of a network environment in which the invention is implemented.

A method and apparatus for packaging an installation program for streaming, and for streaming the installation program to a target processing system over a network, are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

For purposes of this description, it is assumed that the techniques introduced herein are built upon the streaming techniques and architectures described in Raz, Eylon '736 and Eylon '399. In accordance with the present invention, a streamed application delivered to a target system (e.g., a client) comprises the installation or configuration logic for another application (a "subsequent application") that is to be streamed to the target system. In certain embodiments, the installation logic conforms to a well-known installation standard, such as MSI, InstallShield or WISE.

The technique introduced herein allows the use and/or execution of installation logic or other related objects when these objects do not exist in their entirety on the target system. The application installation that results from this process may configure the subsequent application to be delivered only in part (in streamed mode) or in its entirety. The installation logic examines the target system and determines the appropriate components of the subsequent application to install and sets up a customized virtual file system that contains "shells" for these components.

One benefit of this technique is that it supports the use of target system-specific configuration logic contained in the installation package, to ensure accurate deployment of the application and the application environment on the client. In addition, this technique can provide cost savings in relation to "reprocessing" or "re-packaging" of applications to be deployed in conjunction with the streaming techniques described in Raz, Eylon '736 and Eylon '399. The technique also provides the ability to create an application streaming package without the need to run the actual installation of the original application. The technique also provides the ability to create an application streaming package without the need to run the application itself.

To facilitate description, the remainder of this description is based on the MSI standard; however, it will be recognized that essentially the same techniques described below can be easily applied to other well-known installation standards, such as InstallShield or WISE.

The following definitions shall apply to this description:

Streaming package: A software package that was created by the Packaging Studio (see below) for deployment using the techniques described herein.

Streaming Snapshot package: A Streaming package that was created using the snapshot techniques.

Streaming MSI package: A Streaming package that was created with the MSI conversion techniques.

Streaming Snapshot application: A software application (multi-exe or single-exe) that has a Streaming Snapshot package.

Streaming MSI application: A software application (multi-exe or single-exe) that has a Streaming MSI package.

MSI installation package: A conventional MSI installation package that is used to install software applications.

Afiles: All of the files that are part of an MSI installation package and are installed on a system during the installation process.

Ifiles: All of the files that are part of an MSI installation package and which are not Afiles. These files are used by the installation program but are not installed on the system.

FIG. 1 shows a block diagram of a network system 10 implementing aspects of the invention. The system includes a server 12 which is connected to one or more clients 14 via a data network 16, such as the Internet, an intranet, extranet and/or other type(s) of data network(s), including one or more wireless data networks. Before streaming an application, the application files are divided into small segments called "streamlets". Rather than delivering an entire application prior to execution, the server 12 delivers information about the application files and preferably only a small portion of the application itself. In particular, the client 14 receives a file structure specification which defines how files associated with the application and required for the application to operate appear to a computer when the application is locally installed. In particular, the file structure specification defines the structure of at least the primary application file which is loaded by the operating system when the application is initially executed.

Further, a startup streamlet set is preferably sent to the client which includes at least those streamlets containing the portions of the application required to enable execution of the application to be initiated. Preferably, the startup streamlet set comprises those streamlets required to begin application execution and have the application run to a point where user interaction is required. Most preferably, the file structure specification and the startup streamlet(s) are provided to the client packaged in a Startup Block or Init Block. In addition, further application information, such as environmental variable settings, additions to system control files, and other system modifications or additions which may be required to "virtually install" the application can be provided.

After the streamlets in the startup block (or streamlet set) are received and loaded, e.g., during a short streaming initialization phase, and provided environmental information is processed, the application is executed. Even though typically only a small fraction of the application's files (or portions thereof) are locally present on the client, enough is generally present to for the application to run to the point that user interaction is required. The remaining application streamlets can be delivered to the client automatically by the server or in response to fetch requests issued by the client. Preferably, the streamlets are delivered to the client in compressed form and decompressed as they are received and stored locally in a Virtual File System. The streamlets can be forwarded to the client individually or grouped together and pushed to the client in clusters as appropriate. Usage information 20 is sent from the client 14 to the server 12 and can be used by the server to determine which streamlets to provide next.

The server 12 can be configured to automatically forward sequences of streamlets to the client 14 using a predictive streaming engine which selects streamlets to forward according to dynamic statistical knowledge base generated by analyzing the various sequences in which the application program attempts to load itself into memory as various program features are accessed. Such a knowledge base can be generated by analyzing the past and present behavior of the current user, the behavior of the entire user group, or the behavior of subsets within that group. As a result, the streamlets 18 which are predicted to be needed at a given point during execution are automatically sent to the client 14 so that they are generally present before the application attempts to access them. Both code and data, including external files used by the application, can be predictively streamed in this manner.

Statistical techniques can be used to analyze the sequence of code and data loads generated by an operating system as it executes an application and determine an optimal order to push the application streamlets to the client. In one embodiment, the predictive knowledge base can be viewed as a graph where a node is a user request (e.g. save, load) and an edge is the calculated probability that such a request will be made.

Figure 2:
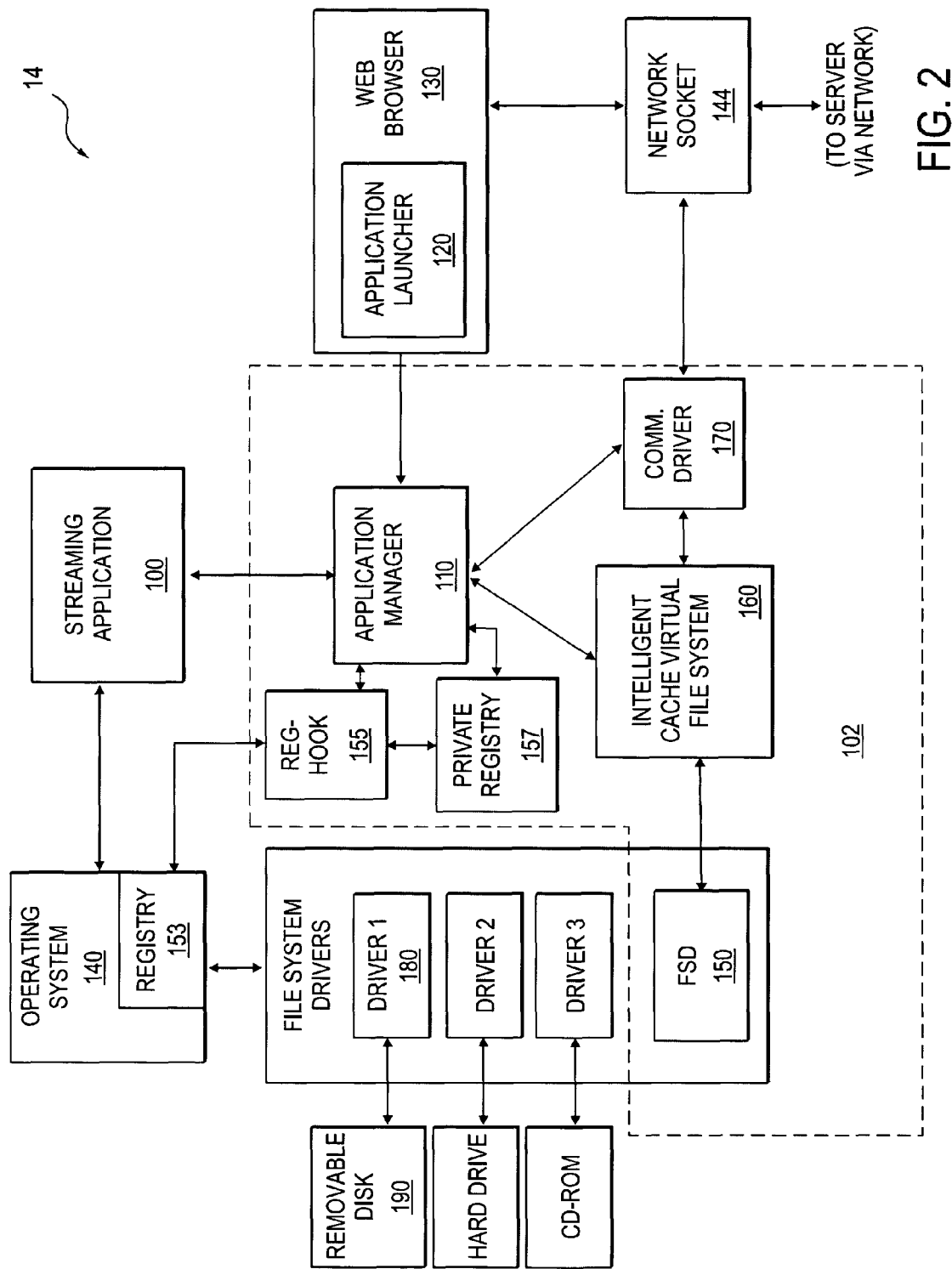
FIG. 2 is a block diagram of a client system according to the invention.

FIG. 2 is a block diagram of the client system 14, showing various streaming control modules which comprise a preferred implementation of the streaming support system 102. The operating system 140 on the client 14 will generally have access to one or more data storage devices 190, such as a removable disk, a hard drive, and a CD-ROM. Each storage device 190 typically has an associated device driver 180 which acts as an interface between the standard I/O protocols used by the operating system 140 and the specific I/O protocols used by the given device 190.

In accordance with one aspect of the invention, the client 14 includes a virtual file system ("VFS") 160 to store and organize received program streamlets and present an appearance to the operating system 140 that all of the application files are locally present. The VFS 160 resides on a local storage device, such as the client's hard drive. Some or all of the VFS 160 can alternatively be retained in system memory. A streaming file system driver ("FSD") 150 is provided to act as an interface between the operating system 140 and the VFS 160. The VFS 160, through the FSD 150, is configured to appear to the operating system as a local virtual file system which can be accessed by the operating system in the same manner as other data storage devices 190. When a streaming application is launched, it is configured to indicate the VFS 160 as the source for application files. Thus, from the point of view of the operating system 140, the application appears to be present on a local drive. However, unlike a conventional local file system 190, such as a hard disk or CD-ROM accessed through a conventional device driver 180, the VFS 160 does not need to (and generally will not) contain complete copies of the various required application files. Instead, only those portions of the various data files which have been provided to the client 14 as streamlets are present. The data behind some files may be missing and other files may be only partially present.

The streaming support system 102 also includes an application manager 110 and a communication driver 170. The application manager 110 is preferably configured to initiate execution of the streaming application 100 after sufficient streamlets have been received. In addition, the application manager can "register" the streaming applications with the VFS 160 and/or FSD 150 to limit access to the streamed data to authorized applications as a way of preventing a user from extracting streamed data from the VFS 160 without authorization. The Application Manager 110 can be further configured to monitor and meter the usage of the program, to indicate the application status to the end user, and perform or initiate cleanup functions when the application is terminated. The communication driver 170 is configured to process streamlets which are pushed to the client from the server and issue requests to the server for streamlets needed by the VFS 160.

The client system also includes a registry hook component (RegHook) 155. RegHook 155 is an interface between the client operating system's normal registry 153 and a private branch of the registry 157 that the application manager 110 creates for purposes of application streaming.

Note that the functionality of the communication driver 170 can be combined with that of the application manager 110. Similarly, the functionality of the application manager 10 can be combined with other modules and a separate application manager module need not be provided. Thus, various functions of the application launcher 120 and application manager 110 can be combined into a single module. Similarly, the functionality of the application launcher 110 and communication driver 170 can instead be implemented in the VFS 160. The specific implementation of the application manager functions is dependent on the operating system 140 and the complexity of the streaming environment, among other factors.

Figure 3:
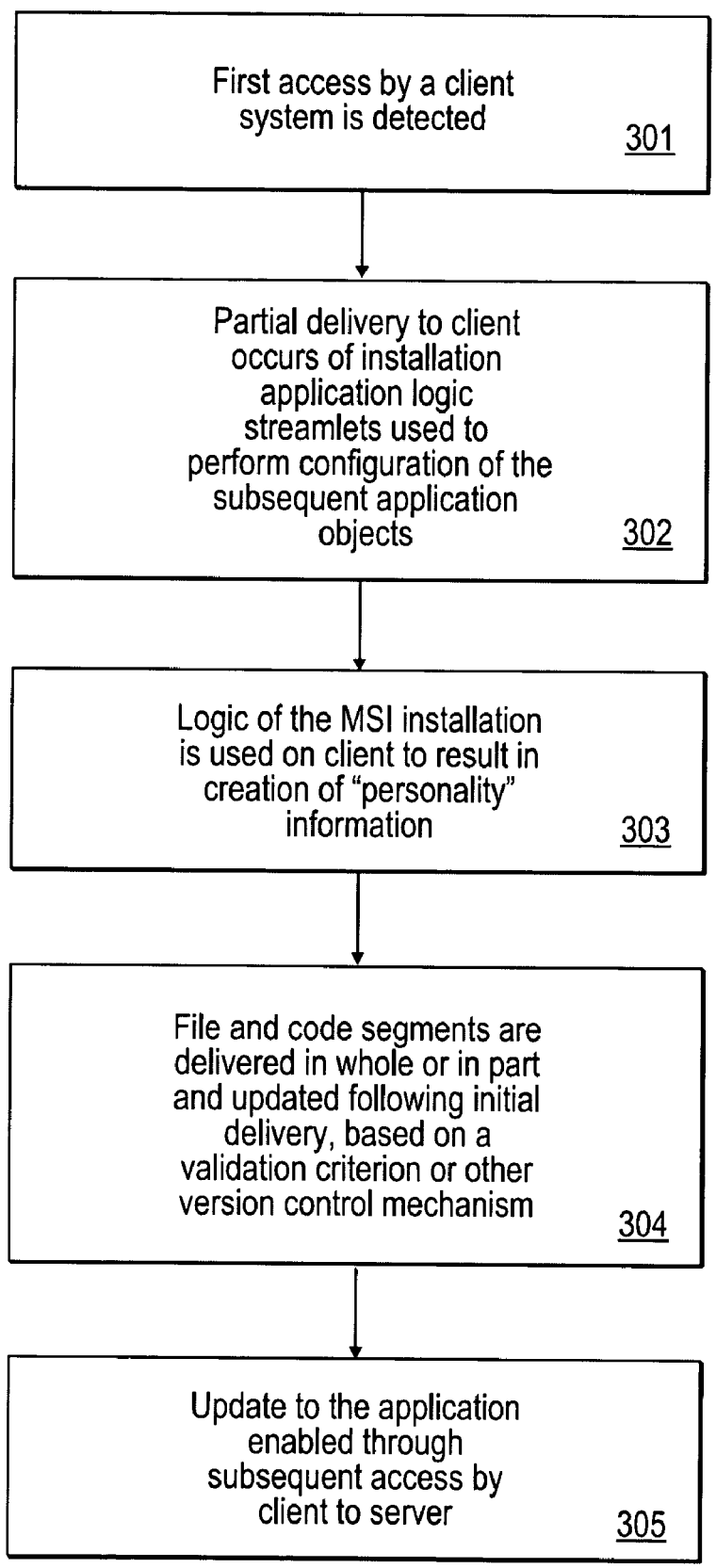
FIG. 3 is a flow diagram showing an overall application streaming process in accordance with the invention.

Referring now to FIG. 3, the following is one embodiment of an overall process according to the present invention, in relation to a software application for which the installation logic conforms to the MSI standard. At block 301, a first access by a client system is detected by the server system. At block 302, partial delivery to the client system occurs from the server, of installation application logic segments (e.g., "streamlets" of the type discussed above) utilized to perform the configuration of the subsequent application objects including application "personality" information, files and program code. By "personality" information, what is meant is user-specific information. For example, in a computer system, different users may have different settings, and an application can be installed for a specific user only (in the user's own files and registry space) or for all users. These files may be delivered in their entirety or in the streamlets approach discussed above.

The logic of the MSI installation is then utilized at block 303 to result in the creation on the client system of "personality" information, or application files or empty file structures to be used by the resulting application installation delivered in the streamlet approach. Subsequent to the streaming of the application installation logic, at block 304 file and code streamlets are delivered to the client system in a whole or in part and updated following initial delivery, based on a validation criterion or other version control mechanism. At block 305, updates to the application can be achieved through a second access by a client to a server, wherein the presence of an update is detected through server mechanisms of client system validation logic. This update may be achieved through the remote execution of upgrade logic contained in an MSI update package following the operations of block 302. The updates may also be achieved through the expiration of a cached object on the client system and subsequent delivery of the updated object streamlets required by the application.

Figure 4:
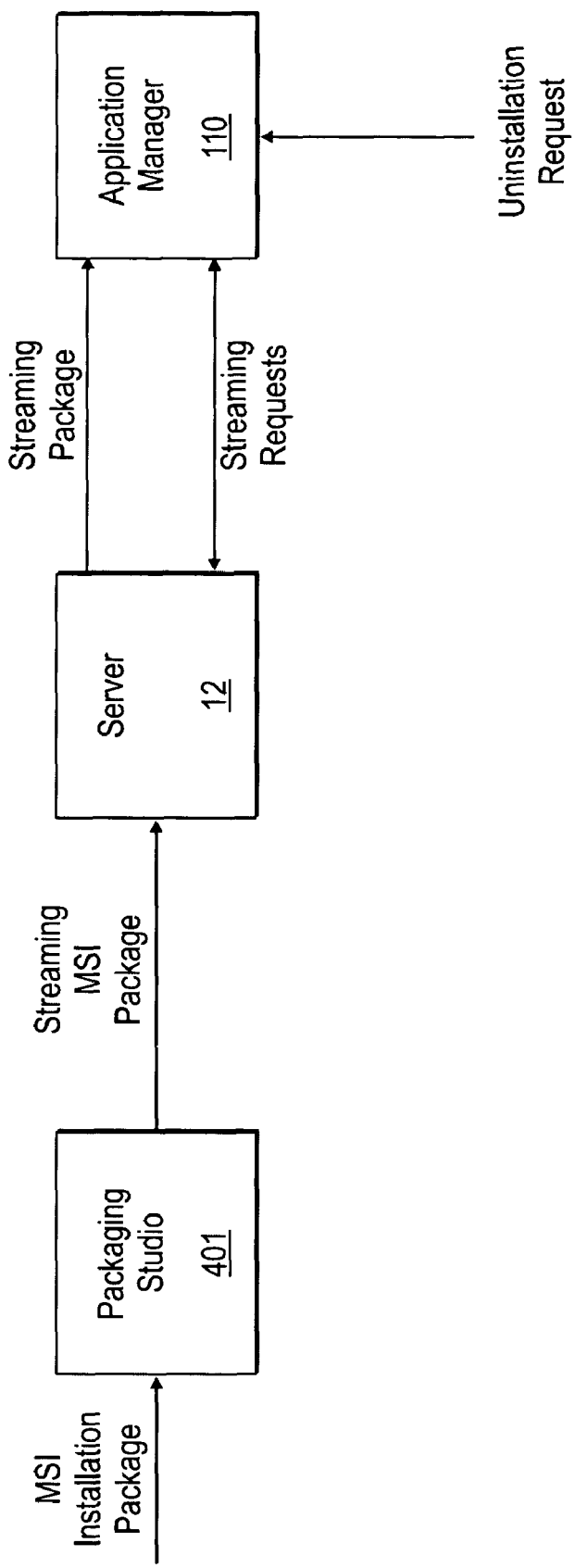
FIG. 4 is a block diagram of a client-server system for streaming applications in accordance with the invention.

Referring now to FIG. 4, the components involved in the deployment of an MSI package are: a packaging studio 401, one or more streaming server(s) 12, and the application manager 110. The packaging studio 401 converts an MSI installation package into a Streaming MSI package. The streaming server 12 deploys the Streaming MSI package to a client 14. The application manager 110 resides on each streaming client 14 and manages the virtual installation, execution and uninstallation of the MSI package on the client. A set of drivers (not shown in FIG. 2) perform the internal files and registry control algorithms for the MSI applications during their lifecycle.

Figure 5:
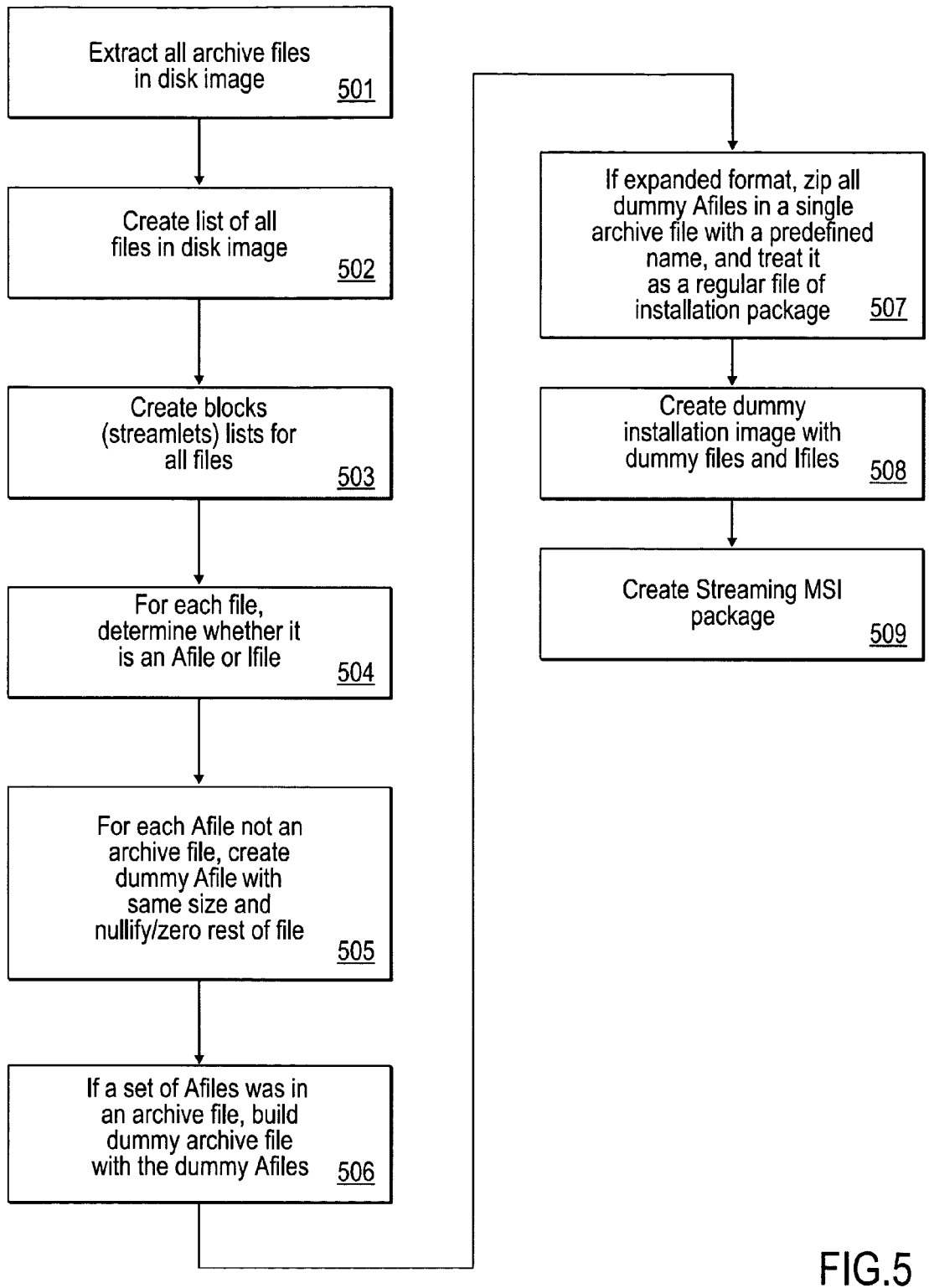
FIG. 5 is a flow diagram showing a process of creating a Streaming MSI Package.

FIG. 5 shows a process of creating a Streaming MSI Package, which is performed by the packaging studio 401. This process is preferably automated (e.g., in software), although it can instead be manual, or a combination of both automated and manual processes. The input to the process is a conventional MSI installation package in one of the following three formats (consider it to be a disk image):

1) Network/expanded install: An MSI file with the source files already expanded into various directories;
2) Compressed/CAB install: An MSI file with the source files contained in cabinet ("CAB") files; or
3) Single file install: An MSI file with the sources files contained in CAB files that are binary streams contained inside the MSI file itself.

Referring now to FIG. 5, the process is as follows: Initially, at block 501 all archive files in the disk image are extracted. Next, at block 502 a list of all the files in the disk image (including archive files and files included within archive files) is created. At block 503, blocks (streamlets) lists are then created for all files (for the server usage). At block 504, for each file, it is determined whether the file is an Afile or an Ifile. At block 505, for each Afile which is not an archive file, a dummy Afile is created which has the same size, however, it is constructed from a fixed size special header (see description of Streaming header format below), and the rest of the file is nullified/zeroed. If a set of Afiles was in an archive file, then at block 506 a dummy archive file is built with the dummy Afiles. In cases of an expanded format, all the dummy Afiles are zipped (compressed) in a single archive file with a predefined name at block 507, and it is treated as a regular file of the installation package. A dummy installation image is created at block 508 with the dummy archive files, the dummy non-archive files and the Ifiles. Note that the dummy archive files are also considered to be Ifiles. Each file in this image is assigned a unique identifier (including archive files and archived files). Finally, at block 509 the Streaming MSI package is created which contains the dummy installation image, Application information ("AppInfo") related to the application relevant to the operating system, and a database. The database contains the whole application including Ifiles and Afiles and indicates the segmenting of the application into blocks (i.e., "streamlets"). This database remains on the streaming server system. The AppInfo includes filenames, registry keys, shortcuts, etc., and appears to be standard application information; however, it represents only the Ifiles in the dummy installation package. The AppInfo also includes the Streaming.ini file contents (described below). The AppInfo is downloaded to the client in response to an installation request from the client.

Figure 6:
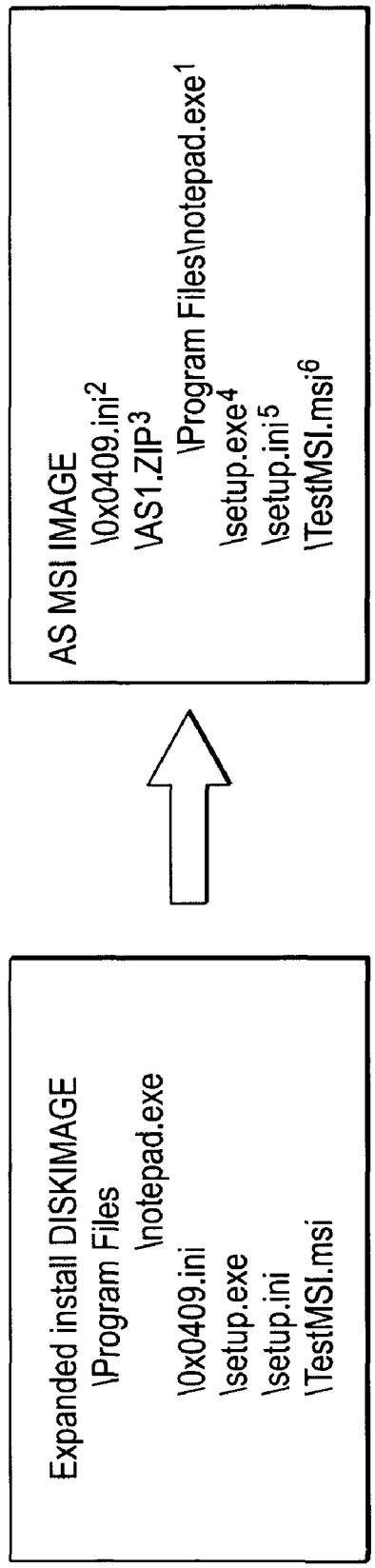
FIG. 6 shows an example of a network/expanded MSI installation format.

Examples of how MSI packages are created will now be described with reference to FIGS. 6, 7 and 8. The example shown in FIG. 6 shows the expanded package format. The file "\Program Files\notepad.exe" would be zeroed and given file ID "1". The "Program Files" directory would then be zipped into "AS1.ZIP". The file ID numbering would then continue, "\0x0409.ini" given file ID "2", and so forth, to "\TestMSI.msi" which would be given file ID "6" (where file IDs are indicated in the figures by the superscript numerals).

Figure 7:
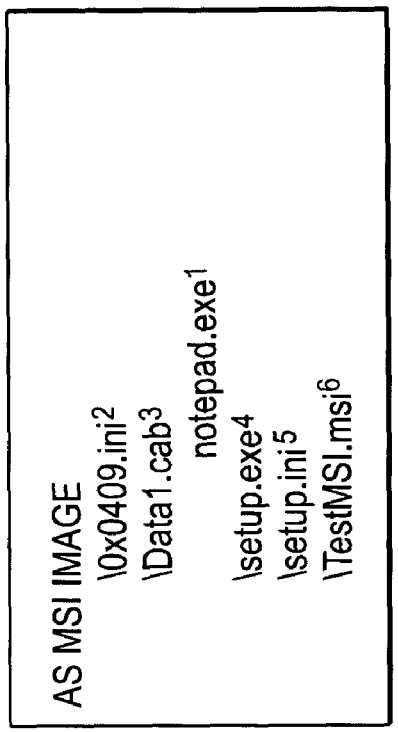
FIG. 7 shows an example of a compressed/CAB MSI installation format.

FIG. 7 shows an example of the CAB package format. In a similar way to the previous example, each file is given an identifier; however, while in expanded format we created our own ZIP file, here we use the existing CAB files. The file "notepad.exe" is zeroed.

Figure 8:
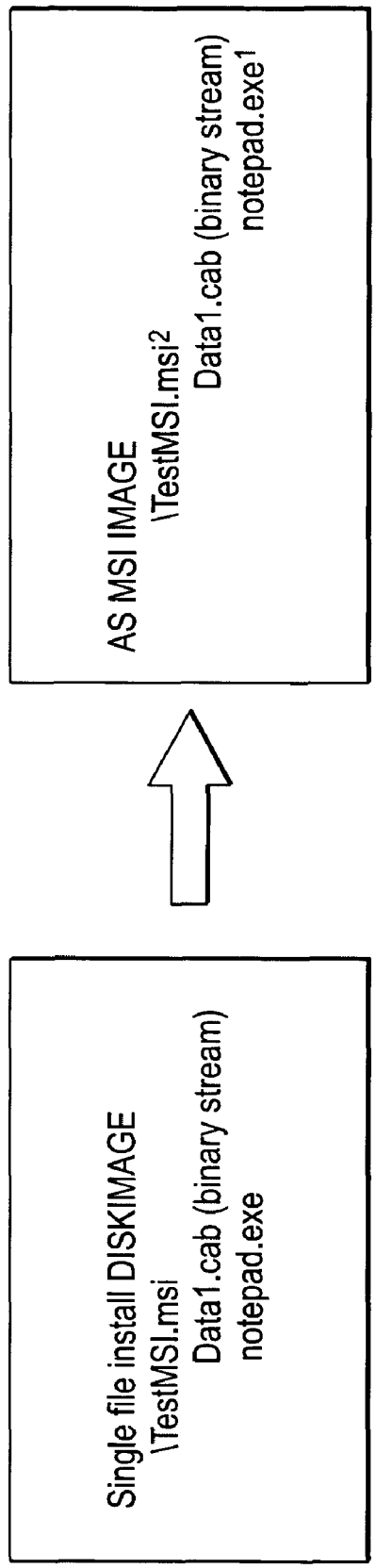
FIG. 8 shows an example of a single-file MSI installation format.

FIG. 8 shows an example of the single file format. In a similar way to the above, each file is given an identifier in the same manner. The difference is that there is no external storage of the source files, so the MSI file is much larger. This single file install assumes the Windows Installer engine already exists and does not need to be included on the disk image. As in the previous example, the file "notepad.exe" is zeroed.

The Streaming header format will now be described. In certain embodiments, the Streaming header is 256 bytes in length, containing the following fields:

| Field | Size |
| --- | --- |
| Streaming signature: "_Streaming" (assuming no starts with this data.) | 10 bytes |
| Package GUID | 16 bytes |
| Package Version | 4 bytes |
| File ID | 4 bytes |
| File Attributes/flags | |
| File Version | 4 bytes |
| File Size | 8 bytes |
| File CRC (original data) | 4 bytes |
| Reserved (zeros) | 198 bytes |
| Header CRC | 4 bytes |
| | Total: 256 bytes |

Any file with a size smaller than that of the Streaming header will be ignored in the zeroing process and marked as an installable file (data for the file will not be retrieved from the server as it will be fully streamed at virtual installation).

Part of the AppInfo described above is a Streaming.ini file. The Streaming.ini file is used as a manifest to keep track of what resides on the streaming server 12 in connection with a particular application. This file is created as part of the packaging process and is downloaded to the requesting client 14. The following is an example of the Streaming.ini file:

```
Streaming.ini
[PackageDescription]
PackageType=1    (0-repackaged / 1-msi)
PackageFormat=1
PackageName=iBaan PDM Client v6.2
PackageVersion=1
OsPlatforms=Windows NT 5.0
VendorName=Baan
VendorVersion=6.2
PackageCreatedTime=1043034800
PackageModifiedTime=1043034800
UniquePackageId=3d442c77-3979-4a38-a120-24ded1cc474d
PackageIconFileName=_DBA77440905B_4230_919A_70A720D0C2C6.gif
PackageIcon Data=xxxxxxxxxxxxxxxxxxxxx
InstallationExec.1=$MSIEXEC$ /i "$APPS_PATH$\MSIFILESDIR\baan.msi" /q
USERNAME="$USERNAME$" INSTALLDIR="$APPS_PATH$"
UnInstallationExec.1=$MSIEXEC$/x "$APPS_PATH$\MSIFILESDIR\baan.msi"
[PreInstallScripts]
[Variables]
```

Figure 9A:
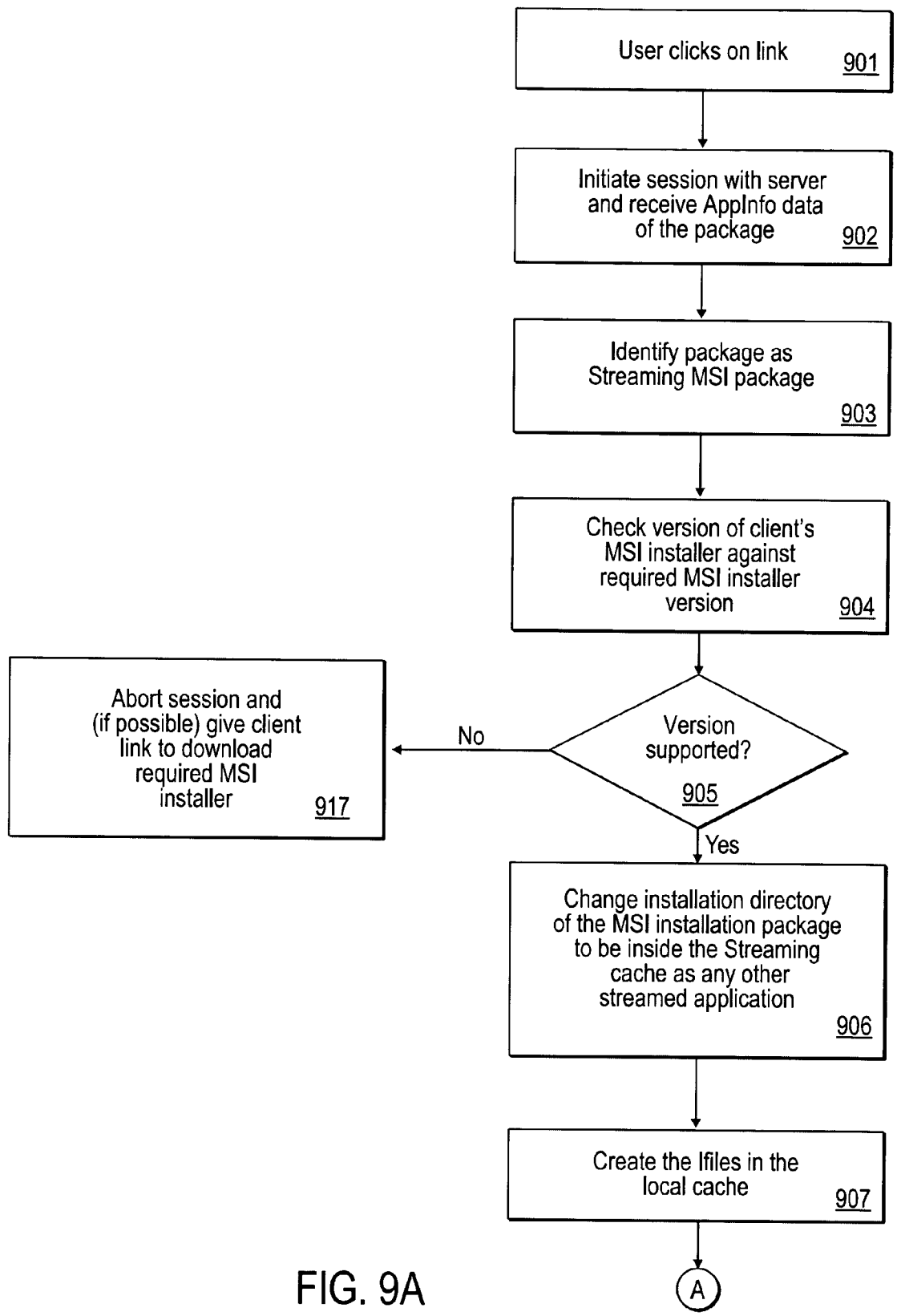
FIG. 9 is a flow diagram showing a process performed by the application manager.
Figure 9B:
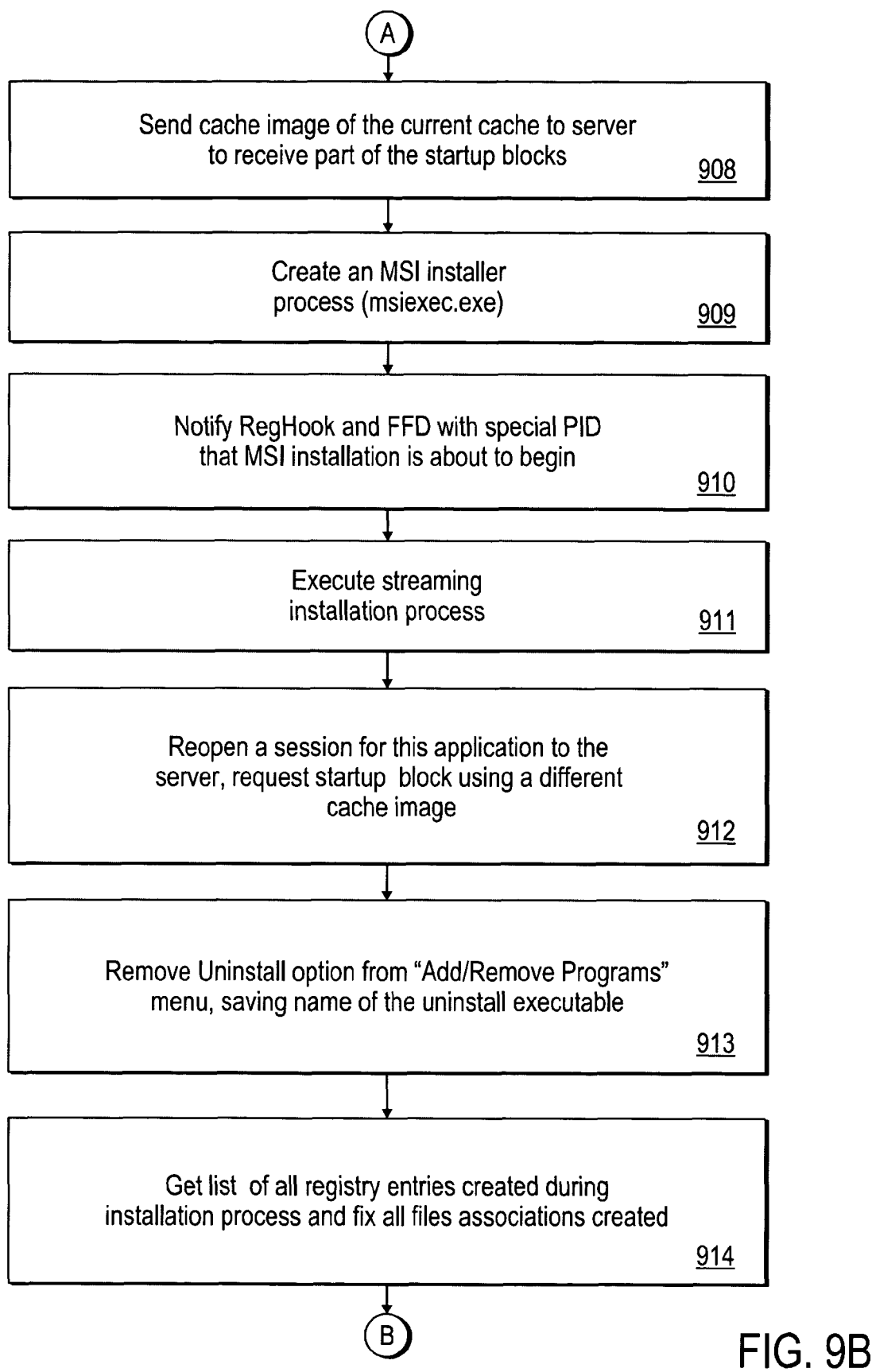
Figure 9C:
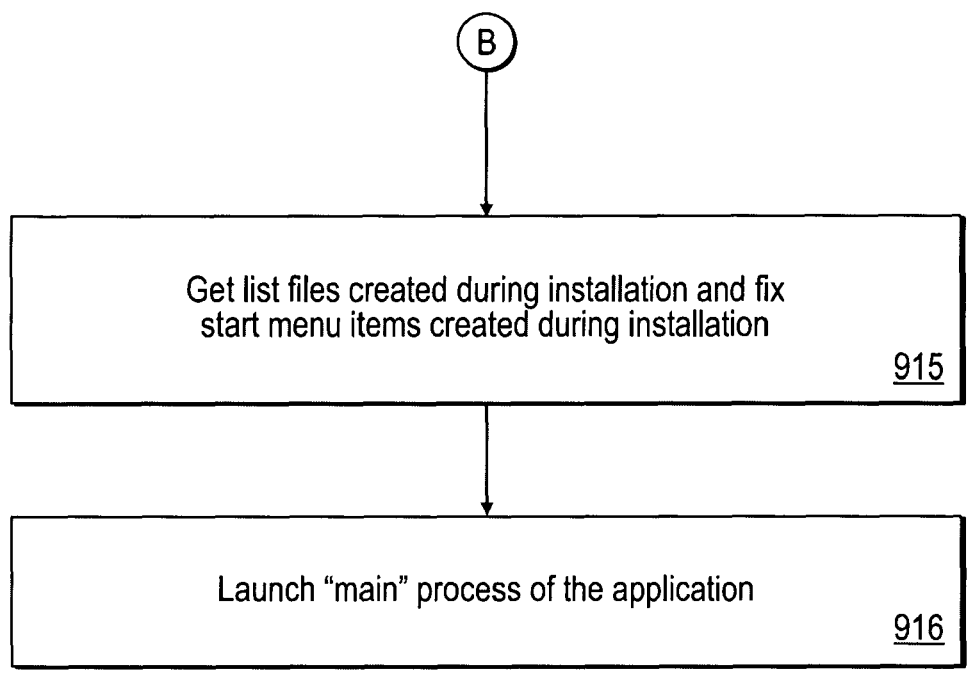

The process of virtual installation of a Streaming MSI package will now be further described with reference to the various components on the client system 14 that participate in this process: the application manager 110, the FSD 150, and the RegHook 155. FIG. 9 shows that part of the process performed by the application manager 110, according to embodiments of the invention. The process is initiated at 901 when a user clicks on a link for a Streaming MSI package. In response, at block 902 the application manager 110 initiates a session with the server 12 (e.g., in the manner described in Eylon '736 and Eylon '399) and receives the AppInfo data of the Streaming MSI package. Only after receiving the AppInfo data is the application manager 110 able at block 903 to identify this package as a Streaming MSI package (from the PackageType field in the Streaming.ini file). At block 904 the application manager 110 checks the version of the client's MSI installer against the required MSI installer version. If the client MSI does not support this MSI package (block 905), the application manager 110 aborts the session at block 917, giving to the client 14 (if possible) a link to download the required MSI installer. Otherwise, the process continues from block 906.

At block 906 the application manager 110 changes the installation directory of the MSI installation package to be inside the streaming cache as any other streamed application. The application manager 110 then creates the Ifiles in the local cache at block 907, using, for example, the technique described in Eylon '736. At block 908 the application manager 110 sends a cache image of the current cache to the server 12 to receive part of the startup blocks (it is assumed the server supports partial cache images). The application manager 110 then creates an MSI installer process (msiexec.exe) at block 909, using the standard MS Installer command line interface to pass the required parameters for the Streaming MSI package. The installation process is created in suspended mode (similar to what is happening today with applications' processes). At block 910 the application manager 110 notifies both the RegHook 155 and the FSD 150 with a special device I/O control, e.g., a process identifier (PID), that an MSI installation is about to begin, passing them the PID of the installation process. The streaming installation is process is then executed at block 911.

During the installation process, the MSI installer is treated as any streamed application and is provided with registry and files data by the Streaming drivers algorithms. When the MSI installation process terminates, the application manager 110 is notified (by the RegHook using an existing mechanism) of its termination. During the installation process, the FSD 150 collects all of the files created by the installation process, and the RegHook 157 collects all of the registry entries created by the installation process.

Once the application manager 110 is notified that the installation was completed, at block 912 it will reopen a session for this application to the server 12, however, this time it will request a startup block using a different cache image. This new cache image is calculated by the FSD 150 during the installation and includes all of the files that were actually installed during the installation process (Afiles).

At block 913 the application manager 110 removes "Uninstall" option from the "Add/Remove Programs" menu, saving the name of the uninstall executable (with its full path). This is done to prevent scenarios in which standard uninstallation is performed for streamed MSI applications. At block 914 the application manager 110 gets the list of all registry entries that were created during the installation process and fixes all files associations that were created. At block 915 the application manager 110 gets a list of files that were created during the installation and fixes start menu items that were created during the installation. Finally, at block 916 the application manager 110 launches the "main" process of the application.

Figure 10:
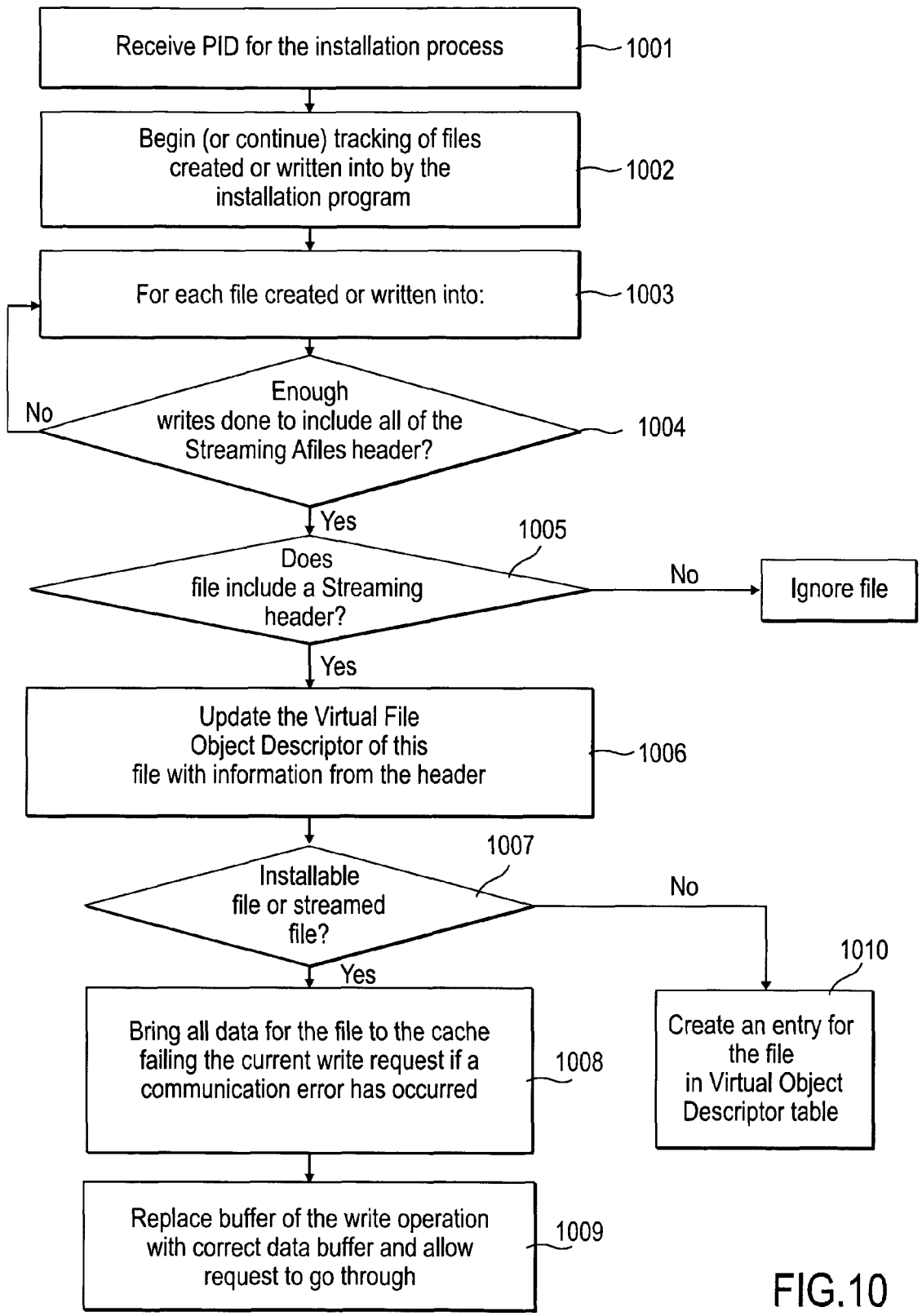
FIG. 10 is a flow diagram showing a process performed by the file system driver (FSD).

The operation of the FSD 150 will now be further described. The basic responsibility of the FSD is to filter disk input/output (I/O) commands in the client. When a block of a streamed application is requested by the client operating system, FSD gets the block from the cache if the block is present in the cache; otherwise, FSD causes the block to be streamed from the server. In addition, according to embodiments of the invention the FSD 150 performs the following process, as shown in FIG. 10.

At block 1001, when the application manager 110 notifies the FSD 150 that an MSI installation is about to begin, the FSD 150 receives the process PID for the installation process from the application manager 110. At block 1002 the FSD 150 then starts to track the files created or written into by the installation program (the installation process and any child processes). Any file created in this PID context is tracked using its file control block (FCB). The FSD 150 builds a File Descriptor for this file and updates an FCB table to include this file so that any I/O done to the same file (actually to any file object with the same FCB, since file objects can be "nameless") will be filtered by the FSD 150.

For each file created or written into (block 1003), the following operations are performed. When enough writes have been done to include all of the Streaming header (e.g., 256 bytes from offset 0) (block 1004), the FSD 150 determines whether the file includes a Streaming header at bock 1005. Note that in most cases the first write will be to offset 0 and will include more than 256 bytes, so the "enough writes" condition is normally satisfied. If the file being written does not include a Streaming header, it is of no interest to the FSD 150. Such a file might be an installable file or a file residing in the cache with all of its data already existing in the cache. If the file includes a Streaming header, the FSD 150 reads the header and decides upon further actions, e.g., whether or not to put the file in the cache.

In particular, if the file being written includes a Streaming header, the FSD 150 will first update the Virtual File Object Descriptor of this file with the information from the header at block 1006, and then based upon the file's location, the FSD 150 will decide at block 1007 if it is an installable file or a streamed file. (Note that this is basically a replacement for the AppInfo information that exists for Streaming Snapshot applications. Here, the FSD 150 needs to build the list of files during the installation process.) If the file does not reside in the filtered directory, it is an installable file. A streamed file is installed under the 'streaming root' or the cache root in the client. For example, if the main installation directory of the application is a\b\, then this will be redirected to <cache root>\a\b\ and every file that is targeted into a\b\ will be redirected to <cache root>\a\b and will be considered streamed. Any other file will be considered installable.

For an installable file, the FSD 150 brings all of the data for the file into the cache at block 1008, failing the current write request if a communication error has occurred. Then, at block 1009 the FSD 150 replaces the buffer of the write operation with the correct data buffer and then allows the write request to go through. This is done with all further write requests.

For streamed files, if the file resides under the filtered directory, an entry is merely created for the file in the Virtual File Object Descriptor table at block 1010, and it is ignored until the installation program ends (besides a scenario described below in which the installation program itself is trying to write something other than the original content of the file to the file). The FSD 150 tracks any subsequent write operations to the file (after the end of the header) and verifies that all of the buffers in the write requests are nullified/zeroed. If the buffer is not nullified, then the installation program is writing some data into the file. The file becomes an installable file, requesting all data from the server or failing the request otherwise. If the file is streamed, the FSD 150 overwrites the entire file with the actual data, and only then allows the write request to go through. The FSD 150 will replace all further write requests' nullified buffers with the correct buffers and will just send the requests through. Any further writes with non-nullified buffers will be merely sent without any tampering.

Delete requests for streamed files can be handled by sending a delete message to the server and deleting the corresponding data on the client. All other requests from the installation process will be completed without tampering.

As noted above, RegHook 155 is an interface between the client operating system's normal registry 153 and a private branch of the registry 157 that the application manager 110 creates for application streaming. When a registration of an installation process arrives at RegHook 155, RegHook 155 will treat it as a usual hooked application, i.e., by creating all keys in the ghost registry, letting it see keys from the real registry and forwarding it to ghost registry values if they exist. RegHook 155 will collect all of the registry entries that are created during the installation (to be passed to the application manager when the installation completes) and will also notify the application manager 110 when the installation process terminates.

Thus, a method and apparatus for packaging an installation program for streaming, and for streaming the installation program to a target processing system over a network, have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    a computer system converting an installation package usable to install a software application on a target processing system from a first format to a second format, wherein the first format does not permit streaming of the installation package, wherein the second format permits streaming of the installation package, and wherein said converting includes replacing a first actual file in the installation package with a first dummy file and replacing a second actual file in the installation package with a second dummy file, wherein the first and second dummy files are subsequently replaceable at the target processing system with the first and second actual files, respectively, and wherein each of the first and second dummy files includes a respective header, and wherein remaining portions of the first and second dummy files are made up of null content; and
    the computer system streaming the converted installation package to the target processing system over a network, wherein said streaming causes the converted installation package to configure the target processing system for execution of the software application.

2. The method as recited in claim 1, wherein the converted installation package is usable in a streaming mode to create user-specific information on the target processing system, wherein the user-specific information is subsequently usable by the software application when the software application is executed on the target processing system.

3. The method as recited in claim 1, wherein the first and second dummy files are the same size as the first and second actual files, respectively, wherein the first dummy file includes an identifier indicative of the first actual file, and wherein the second dummy file includes an identifier indicative of the second actual file.

4. The method as recited in claim 1 further comprising:
    the computer system transmitting portions of the converted installation package to the target processing system, wherein said transmitting causes the target processing system to execute the converted installation package on the target processing system using only portions of the converted installation package that have been transmitted.

5. The method as recited in claim 1, wherein the first and second formats are compatible with a standardized installation format.

6. The method as recited in claim 5, wherein the standardized installation format is an MSI format.

7. A method comprising:
    a client computer system receiving, over a network, an installation package, wherein the installation is usable to install a software application on the client computer system, and wherein the installation package includes one or more dummy files, each of which corresponds to one or more actual files that are not included in the installation package, wherein each of the one or more dummy files includes a header, wherein a remaining portion of each of the one or more dummy files includes content not present in its corresponding one or more actual files;

the client computer system subsequently receiving, over the network, a first of the one or more actual files, wherein the first actual file corresponds to a first of the one or more dummy files;

the client computer system replacing the first dummy file in the installation package with the first actual file; and the client computer system using the installation package and the first actual file to configure the client computer system to install the software application.

8. The method as recited in claim 7, wherein each of the one or more dummy files has the same size as its corresponding actual file.

9. The method as recited in claim 7, wherein the installation package is compatible with a standardized installation format.

10. The method as recited in claim 9, wherein the standardized installation format is an MSI format.

11. A method comprising:

a computer system converting an installation package usable to install a software application on a target processing system from a first format to a second format, wherein the first format is compatible with a standardized installation format and does not permit streaming of the installation package, wherein the second format is compatible with the standardized installation format and permits streaming of the installation package, wherein said converting includes replacing each of one or more actual files in the installation package with a dummy file that is the same size as its corresponding actual file; and the computer system streaming the converted installation package to the target processing system, wherein said streaming causes the target processing system to be configured to execute the software application.

12. The method as recited in claim 11, wherein the converted installation package is usable in a streaming mode to create user-specific information on the target processing system, wherein the user-specific information is subsequently used by the software application when the software application is executed on the target processing system.

13. The method as recited in claim 11, wherein each of the one or more dummy files includes a header, wherein a remaining portion of each of the one or more dummy files includes content not present in its corresponding actual file.

14. A method comprising:

a computer system classifying each of a plurality of files in a first installation package according to a file type of that file, wherein the first installation package is usable to install a software application on a target system;

the computer system creating a dummy file for each of the plurality of files classified as having a first file type, wherein each dummy file includes a header and a remaining portion of the dummy file includes content that has been nullified, and wherein each dummy file is subsequently replaceable by the file for which that dummy file was created; and the computer system creating a second installation package including the dummy files, wherein the second installation package is streamable to the target system.

15. The method as recited in claim 14, wherein the second installation package conforms to an installation standard.

16. The method as recited in claim 14, wherein each dummy file is the same size as the file for which that dummy file was created.

17. The method as recited in claim 16, wherein each dummy file includes an identifier indicative of the file for which that dummy file was created.

18. The method as recited in claim 14, wherein the first and second installation packages are compatible with a standardized format.

19. The method as recited in claim 18, wherein the standardized format is an MSI format.

20. A method of creating an installation package to be streamed to a target system to configure the target system for execution of a software application in a streaming mode, the method comprising:

a computer system extracting, from an installation package including a plurality of files including a set of archive files, wherein the installation package is usable to install the software application, and wherein the installation package is in a form not formatted for streaming;

the computer system creating a list of all of the files in the installation package;

the computer system creating a list of streamlets for all of the files in the installation package;

the computer system classifying each of the files in the installation package as belonging to either a first type or a second type, the first type representing all of the files in the installation package which are normally installed on a system for purposes of installing the software application, the second type representing all of the files in the installation package which are not of the first type;

the computer system, for each file of the first type which is not an archive file, creating a dummy file of the same size with a special header and nullifying all of the other files of the first type;

the computer system creating a dummy archive file for any files of the first type which are contained in an archive file;

the computer system creating a dummy installation image including each said dummy file, each said dummy archive file, and each said file of the second type; and the computer system creating the streaming installation package to include the dummy installation image, application information and a database, wherein the database contains the software application and indicates a segmenting of the application into streamlets, and wherein the application information represents only the files of the second type in the dummy installation image.

21. The method as recited in claim 20, wherein the installation package is in a standardized format.

22. The method as recited in claim 21, wherein the standardized format is an MSI format.

23. An apparatus comprising:

means for converting an installation package usable to install a software application on a target processing system from a first format to a second format, wherein the first format is compatible with a standardized installation format and does not permit streaming of the installation package, and wherein the second format is compatible with the standardized installation format and permits streaming of the installation package, wherein converting the installation program includes replacing a first actual file in the installation package with a first dummy file and replacing a second actual file in the installation package with a second dummy file, wherein the first and second dummy files are subsequently replaceable with the first and second actual files, respectively, wherein the first and second dummy files each include a respective header, wherein a remaining portion of the first dummy file includes content not present in the first actual file; and wherein a remaining portion of the second dummy file includes content not present in the second actual file; and means for streaming the converted installation to the target processing system, wherein said streaming causes the target processing system to be configured to execute the software application.

24. The apparatus as recited in claim 23, wherein the converted installation package is usable in a streaming mode to create user-specific information on the target processing system, wherein the user-specific information is subsequently used by the software application when the software application is executed on the target processing system.

25. The apparatus as recited in claim 23, wherein the first and second dummy files are the same size as the first and second actual files.

26. The method as recited in claim 23, wherein the standardized installation format is an MSI format.

* * * * *